United States Patent
Wagner et al.

(10) Patent No.: US 11,886,983 B2
(45) Date of Patent: Jan. 30, 2024

(54) REDUCING HARDWARE RESOURCE UTILIZATION FOR RESIDUAL NEURAL NETWORKS

(71) Applicant: Microsoft Technology Licensing, LLC, Redmond, WA (US)

(72) Inventors: Andy Wagner, Cupertino, CA (US); Tiyasa Mitra, San Jose, CA (US); Marc Tremblay, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 828 days.

(21) Appl. No.: 17/002,478

(22) Filed: Aug. 25, 2020

(65) Prior Publication Data
US 2022/0067490 A1 Mar. 3, 2022

(51) Int. Cl.
*G06N 3/063* (2023.01)
*G06F 17/16* (2006.01)
*G06N 3/04* (2023.01)
*G06N 3/045* (2023.01)
*G06N 3/084* (2023.01)

(52) U.S. Cl.
CPC ............ *G06N 3/063* (2013.01); *G06F 17/16* (2013.01); *G06N 3/04* (2013.01); *G06N 3/045* (2023.01); *G06N 3/084* (2013.01)

(58) Field of Classification Search
CPC ........ G06N 20/00; G06N 20/10; G06N 20/20; G06N 3/02; G06N 3/04; G06N 3/045; G06N 3/0464; G06N 3/063; G06N 3/084; G06F 17/16
See application file for complete search history.

(56) References Cited

U.S. PATENT DOCUMENTS

| | | | |
|---|---|---|---|
| 2017/0168586 A1* | 6/2017 | Sinha | G06V 40/11 |
| 2018/0018556 A1* | 1/2018 | Young | G06N 3/063 |
| 2021/0303911 A1* | 9/2021 | Li | G06V 10/82 |

OTHER PUBLICATIONS

Lin, et al., "Feature Pyramid Networks for Object Detection", In Repository of arXiv:1612.03144v1, Dec. 9, 2016, 10 Pages.
"International Search Report and Written Opinion Issued in PCT Application No. PCT/US21/030996", dated Aug. 19, 2021, 14 Pages.
Peng, et al., "Self Augmented Deep Generative Network for Blind Image Deblurring", In Proceedings of the Optoelectronic Imaging and Multimedia Technology V, vol. 10817, Nov. 2, 2018, 15 Pages.
Sinha, et al., "Lensless Computational Imaging through Deep Learning", In Repository of arXiv:1702.08516v2, Jun. 26, 2017, 8 Pages.

* cited by examiner

*Primary Examiner* — Shane D Woolwine
(74) *Attorney, Agent, or Firm* — Fountainhead Law Group PC (57) ABSTRACT

Embodiments of the present disclosure include systems and methods for reducing hardware resource utilization by residual neural networks. In some embodiments, a first matrix is received at a layer included in a neural network. The first matrix is compressed to produce a second matrix. The second matrix has a reduced dimensionality relative to a dimensionality of the first matrix. The second matrix is processed through a network block in the layer included in the neural network. The processed second matrix is expanded to produce a third matrix. The third matrix has a dimensionality that is equal to a dimensionality of the first matrix. The third matrix is added to the first matrix to produce a fourth matrix.

20 Claims, 10 Drawing Sheets

REDUCING HARDWARE RESOURCE UTILIZATION FOR RESIDUAL NEURAL NETWORKS

BACKGROUND

The present disclosure relates to a computing system. More particularly, the present disclosure relates to techniques for optimizing neural networks.

Natural-language understanding (NLU) is a subfield of natural-language processing (NLP) in artificial intelligence that addresses comprehension by computers of the structure and meaning of human language. NLU enables voice technology, search engines, and machine translation to deduce what a user means, regardless of the way it is expressed A neural network is a machine learning model that underpins NLU applications. A neural network is trained for a particular purpose by running datasets through it, comparing results from the neural network to known results, and updating the network based on the differences.

BRIEF DESCRIPTION OF THE DRAWINGS

Various embodiments of the present disclosure are illustrated by way of example and not limitation in the figures of the accompanying drawings.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Described here are techniques for reducing hardware resource utilization by residual neural networks. In some embodiments, a residual neural network includes several residual layers. Each residual layer may include a residual stage where input to the residual layer is added to the output of the residual layer. The residual neural network can receive input data, processes it through the several residual layers (among other elements in the residual neural network), and then produces output data. In some embodiments, at least one residual layer in the residual neural network includes a matrix compressor configured before a network block in the residual layer and a matrix expander configured after the network block. When the residual layer receives an input matrix, the matrix compressor compresses the input matrix to produce a matrix with less dimensions than the input matrix. The network block, which is configured to process matrices having the size of the compressed input matrix, receives the compressed matrix, processes it, and generates an output matrix. The matrix expander expands the output matrix to produce another matrix with more dimensions than the output matrix. The expanded matrix may have the same dimensionality as the input matrix.

The techniques described in the present application provide a number of benefits and advantages over conventional methods of implementing residual neural networks. For instance, by using network blocks in residual layers that are configured to process matrices having a lower dimensionality than input matrices received at the residual layers, the amount of computation and/or input/output (I/O) processing used to process the input matrices through the network blocks is reduced compared to those required to process the input matrices through conventional network blocks in residual layers of residual neural networks. This allows larger input matrices to be used (e.g., larger hidden sizes, longer sequence lengths, and/or larger depth) while maintaining or reducing the amount of hardware resources utilized to process such input matrices.

Figure 1:
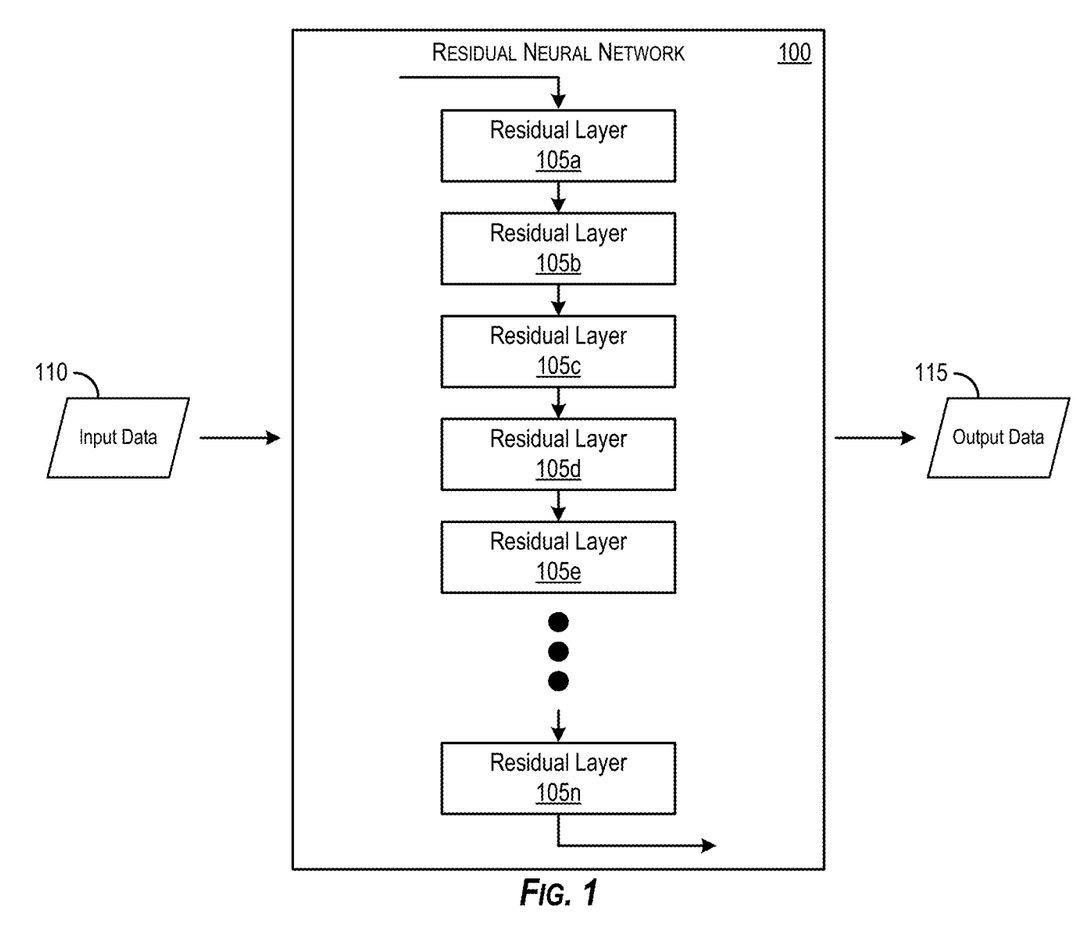
FIG. 1 illustrates an example residual neural network according to some embodiments.

FIG. 1 illustrates an example residual neural network 100 according to some embodiments. As shown, residual neural network 100 includes residual layers 105a-n. For purposes of simplicity and explanation, FIG. 1 shows only residual layers. However, one of ordinary skill in the art will appreciate that residual neural network 100 can include additional elements that feed into residual layers 105a-n and/or additional elements that process output produced by residual layers 105a-n. In addition, residual neural network 100 may include other elements arranged between residual layers 105a-n.

Each of the residual layers 105a-n may include a residual stage (not shown). In some embodiments, a residual stage in a residual layer 105 is configured to add input received at the residual layer 105 to the output produced by residual layer 105. As shown in FIG. 1, residual neural network 100 receives input data 110. Upon receiving input data 110, residual neural network 100 can process it through any elements in residual neural network 100 that are arranged before residual layers 105a-n.

When data reaches residual layer 105a, residual layer 105a processes through residual layer 105b the data to produce output data. Residual layer 105a adds the data to the output data and forwards it to residual layer 105b. Residual layer 105b processes this data in a similar manner as residual layer 105a. That is, residual layer 105b processes the data through residual layer 105b to produce output data, adds the data received at residual layer 105b to the output data, and forwards it to residual layer 105c. This process continues through the rest of the residual layers 105c-105n. The output produced by residual layer 105n may be sent to any elements in residual neural network 100 that are arranged after residual layers 105a-n for further processing. Once residual neural network 100 finishes processing input data 100, it generates output data 115.

Figure 2:
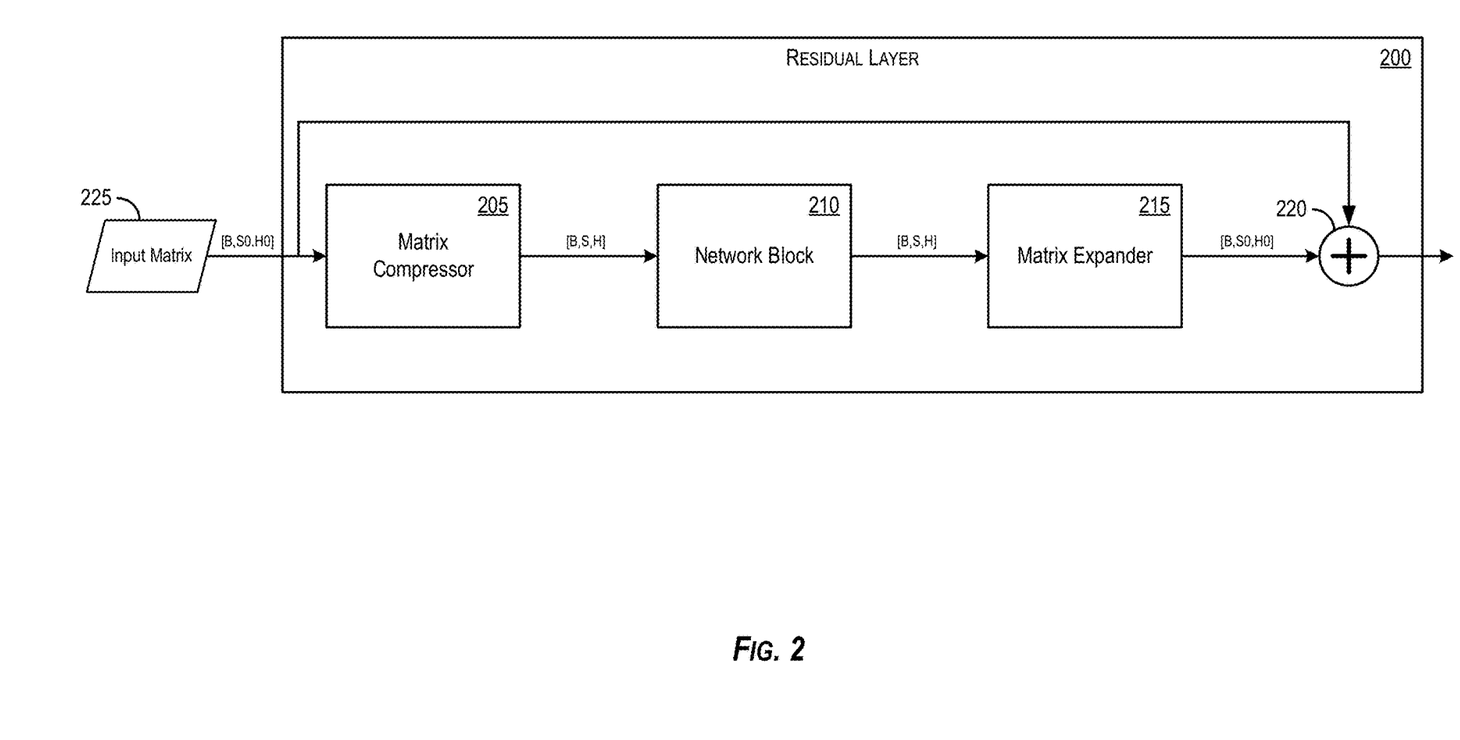
FIG. 2 illustrates an example residual layer according to some embodiments.

FIG. 2 illustrates an example residual layer 200 according to some embodiments. In some embodiments, residual layer 200 can be used to implement any of the residual layers 105a-n. As shown, residual layer 200 includes matrix compressor 205, network block 210, matrix expander 215, and residual stage 220.

Matrix compressor 205 is configured to compress input matrices to a dimensionality that network block 210 is configured to process. As shown in FIG. 2, network block 210 is configured to process matrices having a dimensionality of [B,S,H]. As such, when matrix compressor 205 receives input matrix 225, which has a dimensionality of [B,S0,H0] in this example, matrix compressor 205 compresses input matrix 225 to produce a matrix having a dimensionality of [B,S,H]. S0 is assumed to be larger than S and H0 is assumed to be larger than H.

Matrix compressor 205 may use different techniques to compress a matrix. For instance, matrix compressor 205 can use a decimation technique to compress input matrix 225 into a matrix that has a dimensionality of [B,S,H]. In some embodiments, the decimation technique involves selecting every nth element in input matrix 225 according to the following equation (1):

$$o[x]=i[n*x+\text{offset}]$$

where o is the compressed matrix, [x] is the index of an element in the compressed matrix, i is the input matrix, [n*x+offset] is the index of an element in the input matrix, n is a defined value, and offset is a defined offset value. As an example, if n equals the value 3 and the offset value is 0, matrix compressor 205 selects the first element of the input matrix to be the first element of the compressed matrix, selects the fourth element of the input matrix to be the second element of the compressed matrix, selects the seventh element of the input matrix to be the third element of the compressed matrix and so on and so forth.

Figure 3:
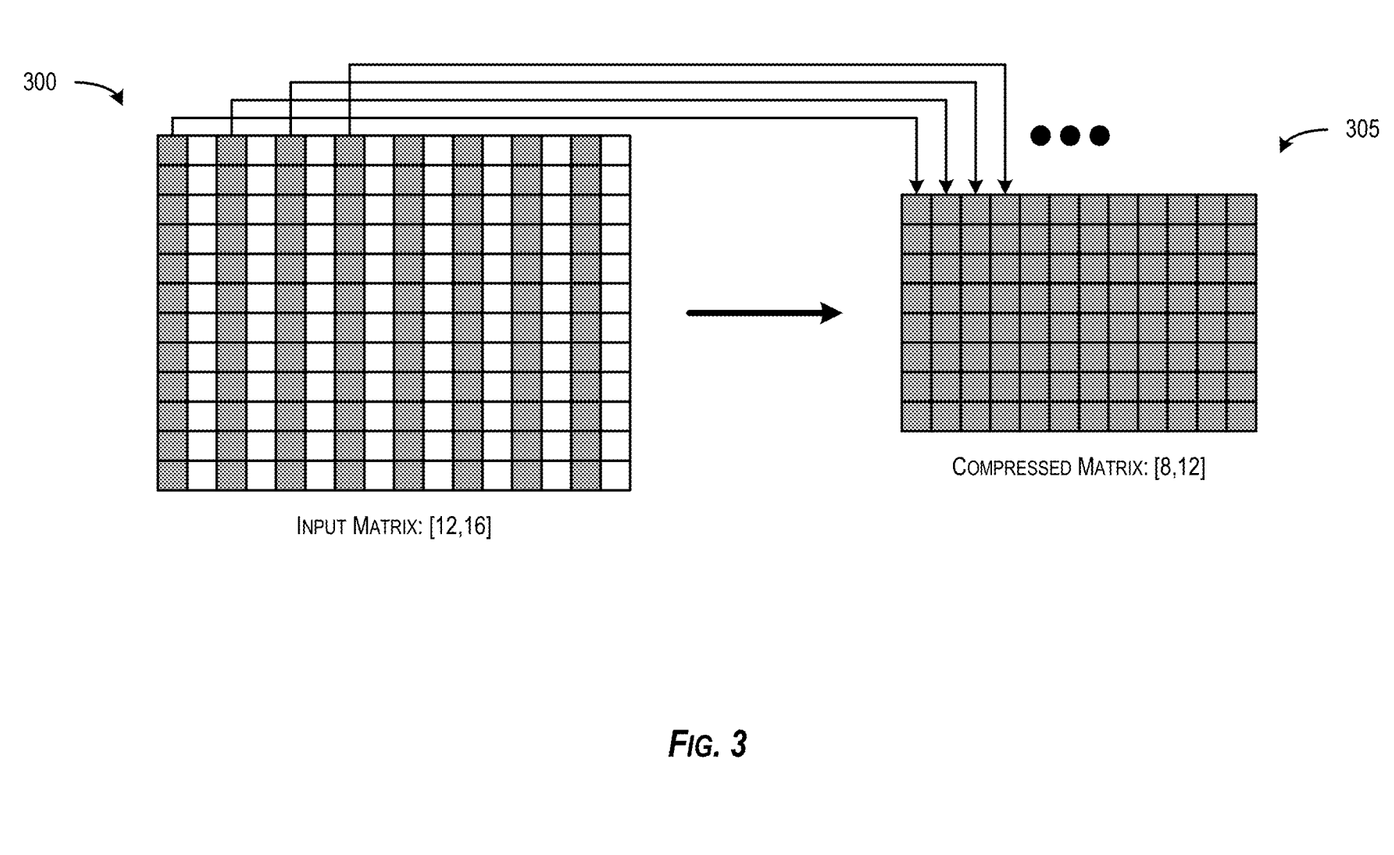
FIG. 3 illustrates an example of compressing a matrix using decimation according to some embodiments.

FIG. 3 illustrates an example of compressing a matrix 300 using decimation according to some embodiments. As shown, input matrix 300 has a dimensionality of [12,16]. In this example, network block 210 is configured to process matrices that have a dimensionality of [8,12]. Since the number of elements in the matrices that network block 210 is configured to process is half of the number of elements in input matrix 300, matrix compressor 205 determines the values of n and offset in equation (1) to be 2 and 0, respectively. Thus, matrix compressor 205 selects the first element of input matrix 300 to be the first element in compressed matrix 305, the third element of input matrix 300 to be the second element in compressed matrix 305, the fifth element of input matrix 300 to be the third element in compressed matrix 305, etc. As illustrated, matrix compressor 205 selects every other element input matrix 300 to be in compressed matrix 305. For this example, matrix compressor 205 determines n to be the value of 2, which is the minimum value of n that allows matrix compressor 205 to select from the entire range of elements in input matrix 300. Matrix compressor 205 can use an n value that is higher than this minimum value to select elements from input matrix 300 for compressed matrix 305. Matrix compressor 205 may pad any remaining elements in compressed matrix 305 with 0 values.

In some embodiments, matrix compressor 205 employs a block sampling technique to compress a matrix. The block sampling technique selects a block of elements in input matrix 225 according to the following equation (2):

$$o[0:x]=i[k:k+x]$$

where o is the compressed matrix, [0:x] is the range of indexes of elements in the compressed matrix, i is the input matrix, [k:k+x] is the range of indexes of elements in the input matrix, and k is a defined offset value. As an example, if the compressed matrix has a range of indexes of 0:9 (i.e., it contains 10 elements), matrix compressor 205 can select the first ten elements of the input matrix to be the elements of the compressed matrix. Alternatively, matrix compressor 205 may select the second through eleventh elements of the input matrix, the third through twelfth elements of the input matrix, the fourth through thirteenth elements of the input matrix, etc., to be the elements of the compressed matrix.

Figure 4:
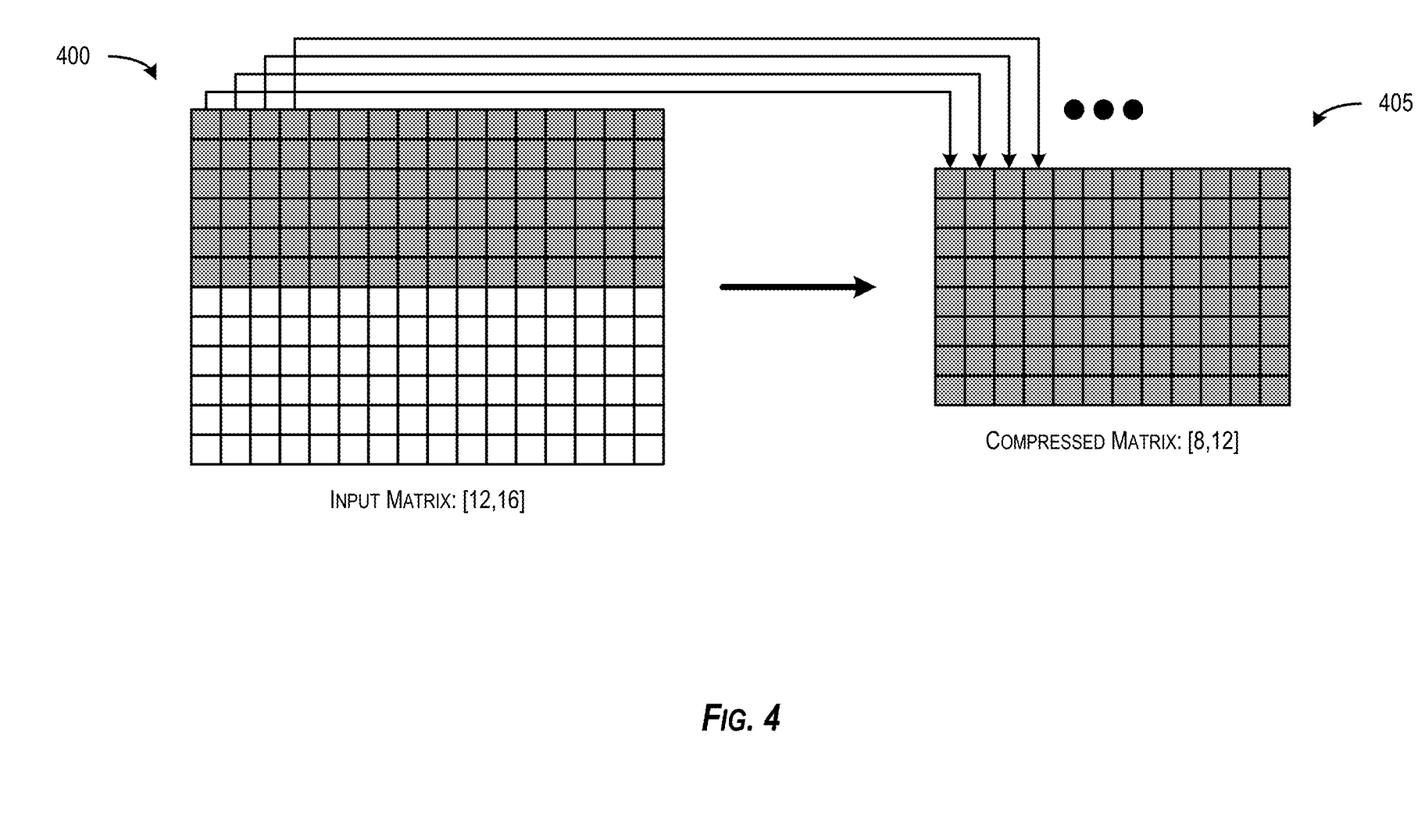
FIG. 4 illustrates an example of compressing a matrix using block sampling according to some embodiments.

FIG. 4 illustrates an example of compressing a matrix 400 using block sampling according to some embodiments. Similar to FIG. 3, for this example, input matrix 400 has a dimensionality of [12,16] and network block 210 is configured to process matrices that have a dimensionality of [8,12]. Because the number of elements in the matrices that network block 210 is configured to process is half of the number of elements in input matrix 300, the range of indexes for compressed matrix 405 is [0:95]. Based on equation (2), matrix compressor 205 determines an offset value of 0 for k. As such, matrix compressor 205 selects the first 96 elements of input matrix 400 to be the elements in compressed matrix 405. One of ordinary skill in the will understand that matrix compressor 205 can select a number of different k values to select different blocks of elements in input matrix 400 to be the elements in compressed matrix 405.

Returning to FIG. 2, network block 210 is responsible for predicting a set of outputs given a set of inputs. In some embodiments, network block 210 may be a neural network that includes one or more layers of nodes and a set of internal weights. The set of weights can be trained using training data. As shown, network block 210 receives a compressed matrix from matrix compressor 205, processes the compressed matrix, and outputs it to matrix expander 215.

Matrix expander 215 is configured to expand the dimensionality of matrices. For this example, matrix expander 215 expands compressed matrices into matrices that have the same dimensionality as input matrix 225 (i.e., a dimensionality of [B,S0,H0]). Upon receiving a compressed matrix from network block 210, which has a dimensionality of [B,S,H] in this example, matrix expander 215 expands the compressed matrix to produce a matrix having a dimensionality of [B,S0,H0]. In some embodiments, matrix expander 215 uses the reverse operation that matrix compressor 205 used to compress input matrix 225. For instance, if matrix compressor 205 uses a decimation technique to compress input matrix 205, matrix expander 215 uses a reverse decimation technique to expand the compressed matrix. Similarly, if matrix compressor 205 uses a block sampling technique to compress input matrix 205, matrix expander 215 uses a reverse block sampling technique to expand the compressed matrix.

Figure 5:
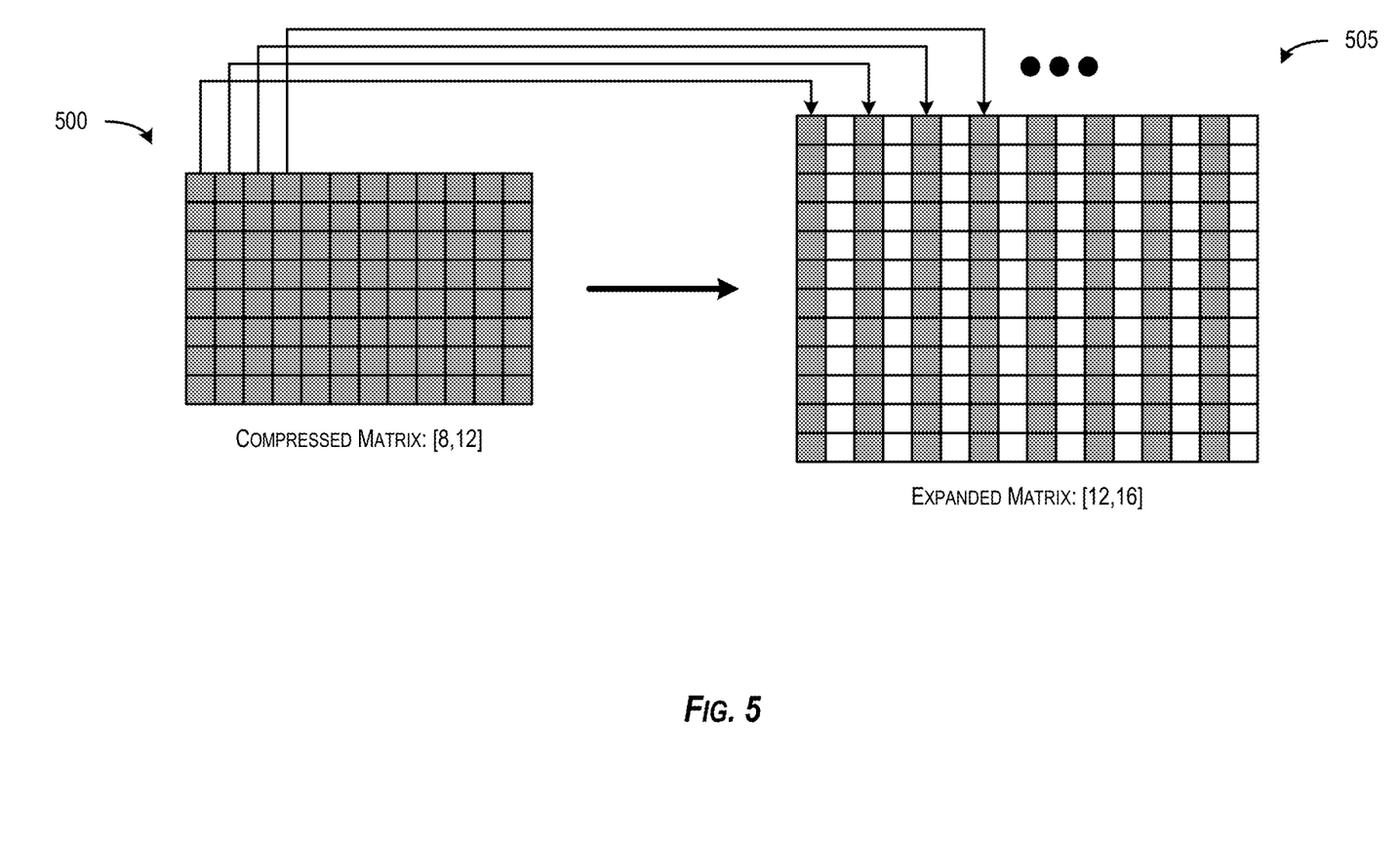
FIG. 5 illustrates an example of expanding a matrix using reverse decimation according to some embodiments.

FIG. 5 illustrates an example of expanding a matrix 500 using reverse decimation according to some embodiments. In this example, compressed matrix 500 has been compressed to the same dimensionality as compressed matrix 305 (i.e., a dimensionality of [8,12]) using the same the decimation technique shown in FIG. 3. Here, matrix expander 215 expands compressed matrix 500 into expanded matrix 505 by placing elements from the compressed matrix 500 into the expanded matrix 505 in the same corresponding positions as the positions of the elements in original input matrix (e.g., input matrix 300). As illustrated in FIG. 5, matrix expander 215 places the first element in compressed matrix 500 in the first element in expanded matrix 505, places the second element in compressed matrix 500 in the third element in expanded matrix 505, places the third element in compressed matrix 500 in the fifth element in expanded matrix 505, and so on and so forth. After matrix expander 215 finishes placing the elements in compressed matrix 500 in expanded matrix 505, matrix expander 215 pads each of the remaining positions (e.g., the position of the second element, the position of the fourth element, the position of the sixth element, etc.) in expanded matrix 550 with a 0 value.

Figure 6:
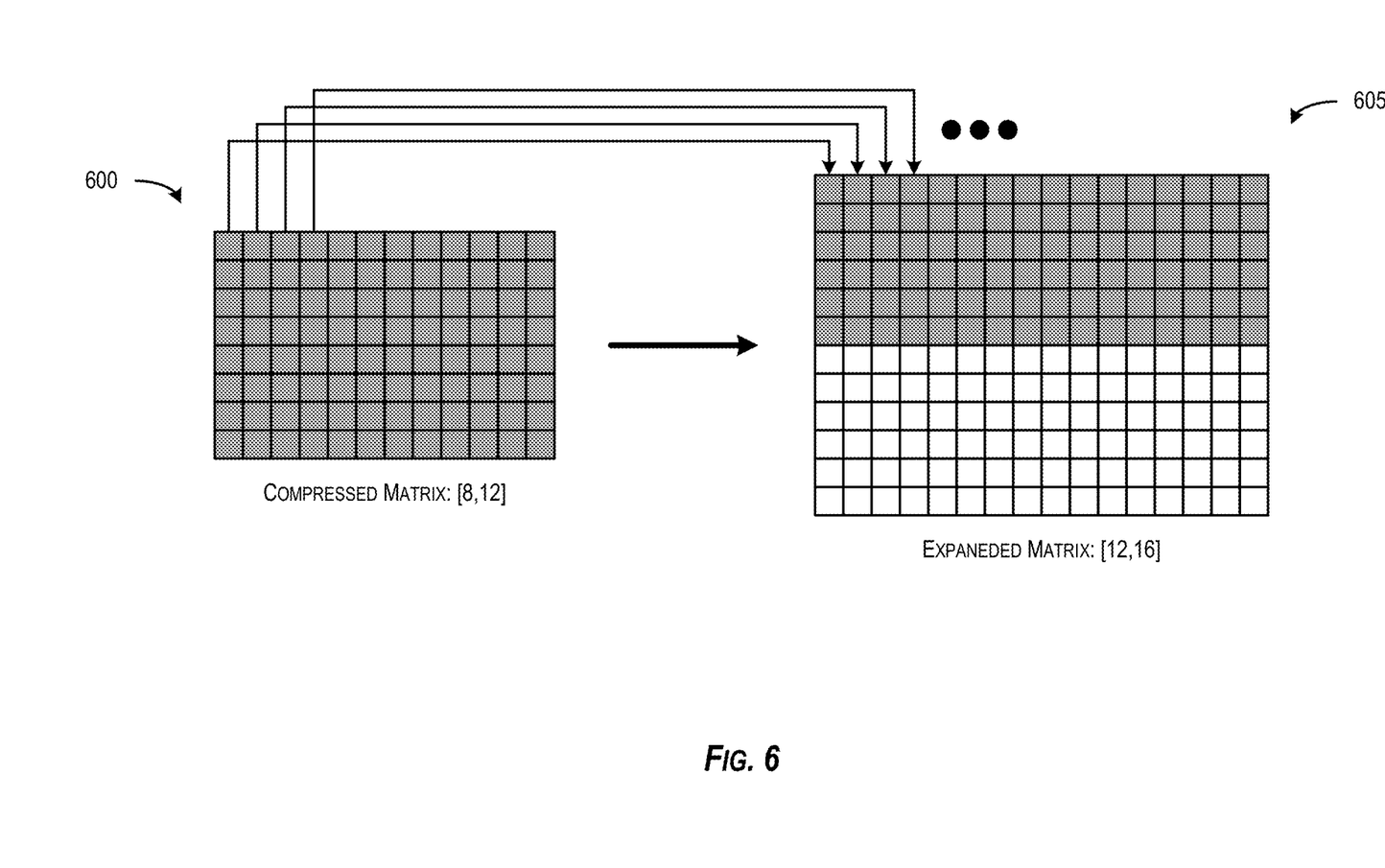
FIG. 6 illustrates an example of expanding a matrix using reverse block sampling according to some embodiments.

FIG. 6 illustrates an example of expanding a matrix 600 using reverse block sampling according to some embodiments. For this example, compressed matrix 600 has been compressed to the same dimensionality as compressed matrix 405 (i.e., a dimensionality of [8,12]) using the same the block sampling technique shown in FIG. 4. In this example, matrix expander 215 expands compressed matrix 600 into expanded matrix 605 by placing the elements from the compressed matrix 600 into the expanded matrix 605 in the same corresponding positions as the positions of the elements in original input matrix (e.g., input matrix 400). As depicted in FIG. 6, matrix expander 215 places the block of elements in compressed matrix 600 at the beginning of expanded matrix 505. Next, matrix expander 215 pads each of the remaining positions (e.g., the positions of the block of elements in the latter half of expanded matrix 505) in expanded matrix 550 with a 0 value.

Returning to FIG. 2, residual stage 220 handles the addition of input matrices and output matrices. In this example, the output of matrix expander 215 would be the output of residual layer 200 without residual stage 220. As such, residual stage 220 is configured to add input matrix 225 to the output of matrix expander 215. The resulting matrix is now the output of residual layer 200.

Figure 7:
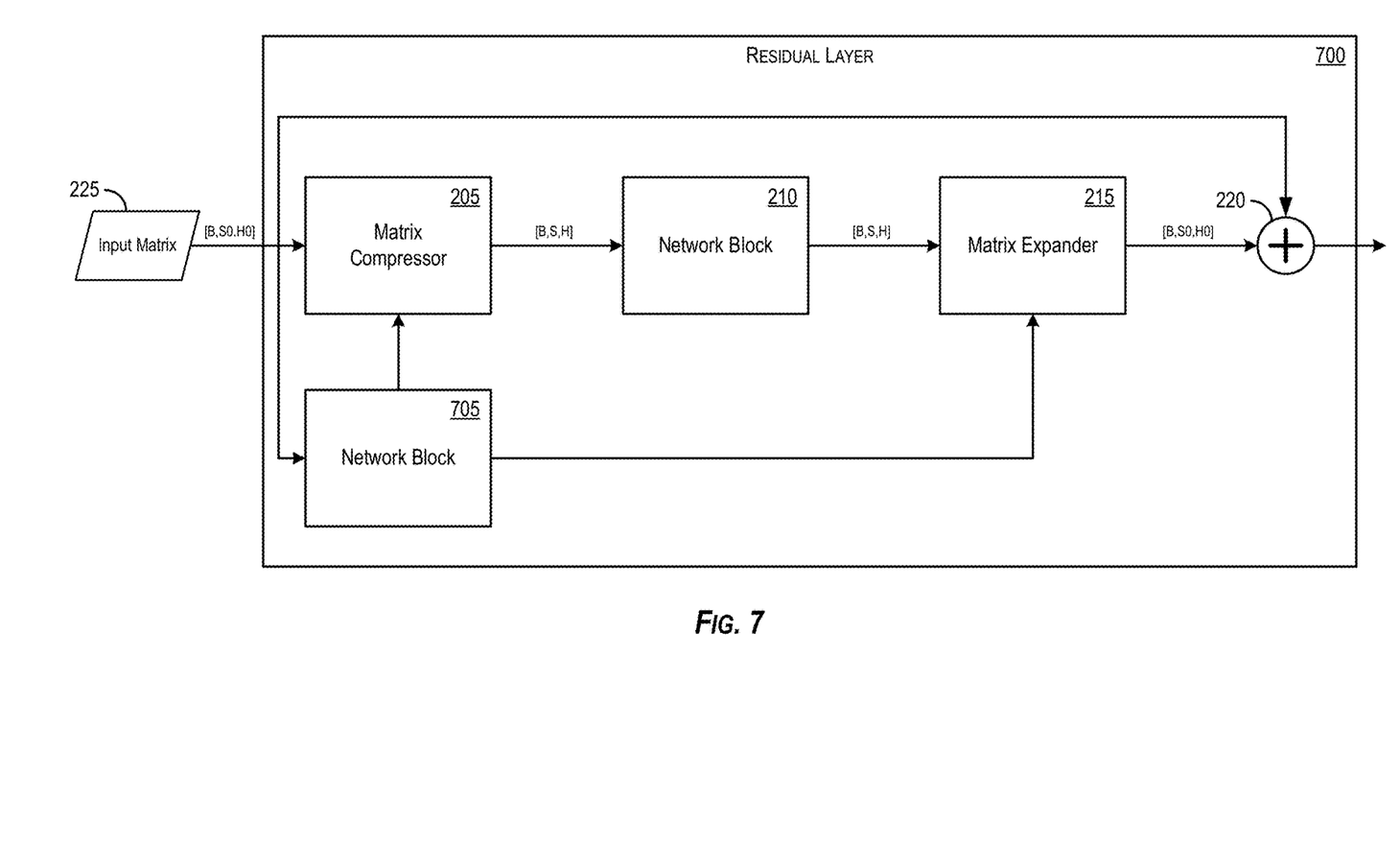
FIG. 7 illustrates another example residual layer according to some embodiments.

FIG. 7 illustrates another example residual layer 700 according to some embodiments. Specifically, residual layer 700 is similar to residual layer 200 except residual layer 700 further includes network block 705. Network block 705 is configured to determine, based on input matrix 225, a compression technique for matrix compressor 205 to use and an expansion technique for matrix expander 215 to use. For example, if network block 705 determines that matrix compressor 205 is to use a decimation technique (e.g., the decimation technique shown in FIG. 3), network block 705 may determine that matrix expander 215 use a reverse decimation technique (e.g., the reverse decimation technique illustrated in FIG. 5). Similarly, if network block 705 determines that matrix compressor 205 is to use a block sampling technique (e.g., the block sampling technique depicted in FIG. 4), network block 705 can determine that matrix expander 215 use a reverse block sampling technique (e.g., the reverse block sampling technique shown in FIG. 6).

In some embodiments, network block 705 can be a fully connected network that has been trained to determine a compression technique for matrix compressor 205 to use and an expansion technique for matrix expander 215 to use. In other embodiments, network block 705 is a neural network that includes a classifier stage for selecting a compression technique for matrix compressor 205 to use and an expansion technique for matrix expander 215 to use. One of ordinary skill in the art will realize that any number of different neural networks may be used to implement network block 705.

Figure 8:
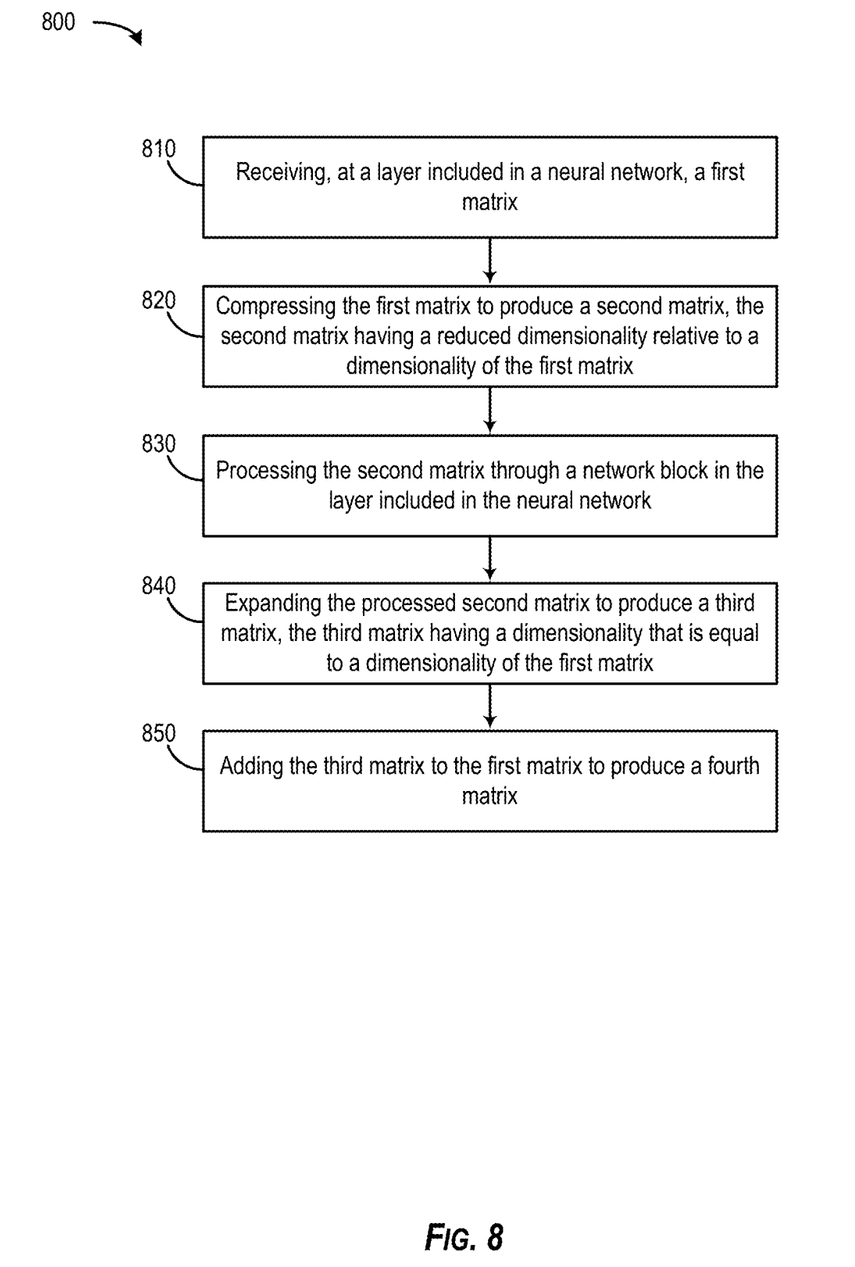
FIG. 8 illustrates a process for reducing hardware resource utilization for a residual layer according to some embodiments.

FIG. 8 illustrates a process 800 for reducing hardware resource utilization for a residual layer according to some embodiments. In some embodiments, a residual layer (e.g., residual layer 200 or residual layer 700) performs process 800. Process 800 begins at 810 by receiving, at a layer included in a neural network, a first matrix. Referring to FIG. 2 as an example, residual layer 200 may receive input matrix 225.

Next, process 800 compresses, at 820, the first matrix to produce a second matrix. The second matrix has a reduced dimensionality relative to a dimensionality of the first matrix. Referring to FIG. 2 as an example, matrix compressor 205 compresses input matrix 225, which has a dimensionality of [B,S0,H0], to produce a matrix having a dimensionality of [B,S,H]. As mentioned above, S0 and H0 are larger than S and H, respectively. Therefore, the dimensionality of the compressed matrix is less than the dimensionality of input matrix 225.

Process 800 then processes, at 830, the second matrix through a network block in the layer included in the neural network. Referring to FIG. 2 as an example, the compressed matrix produced by matrix compressor 205 is processed through network block 210. At 840, process 800 expands the processed second matrix to produce a third matrix. The third matrix has dimensionality that is equal to a dimensionality of the first matrix. Referring to FIG. 2 as an example, matrix expander 215 expands the output from network block 210 to produce an expanded matrix that has the same dimensionality as the dimensionality of input matrix 225. Finally, process 800 adds, at 850 the third matrix to the first matrix to produce a fourth matrix. Referring to FIG. 2 as an example, residual stage 220 adds input matrix 225 to the output of matrix expander 215 to produce a matrix that is the output of residual layer 200.

Figure 9:
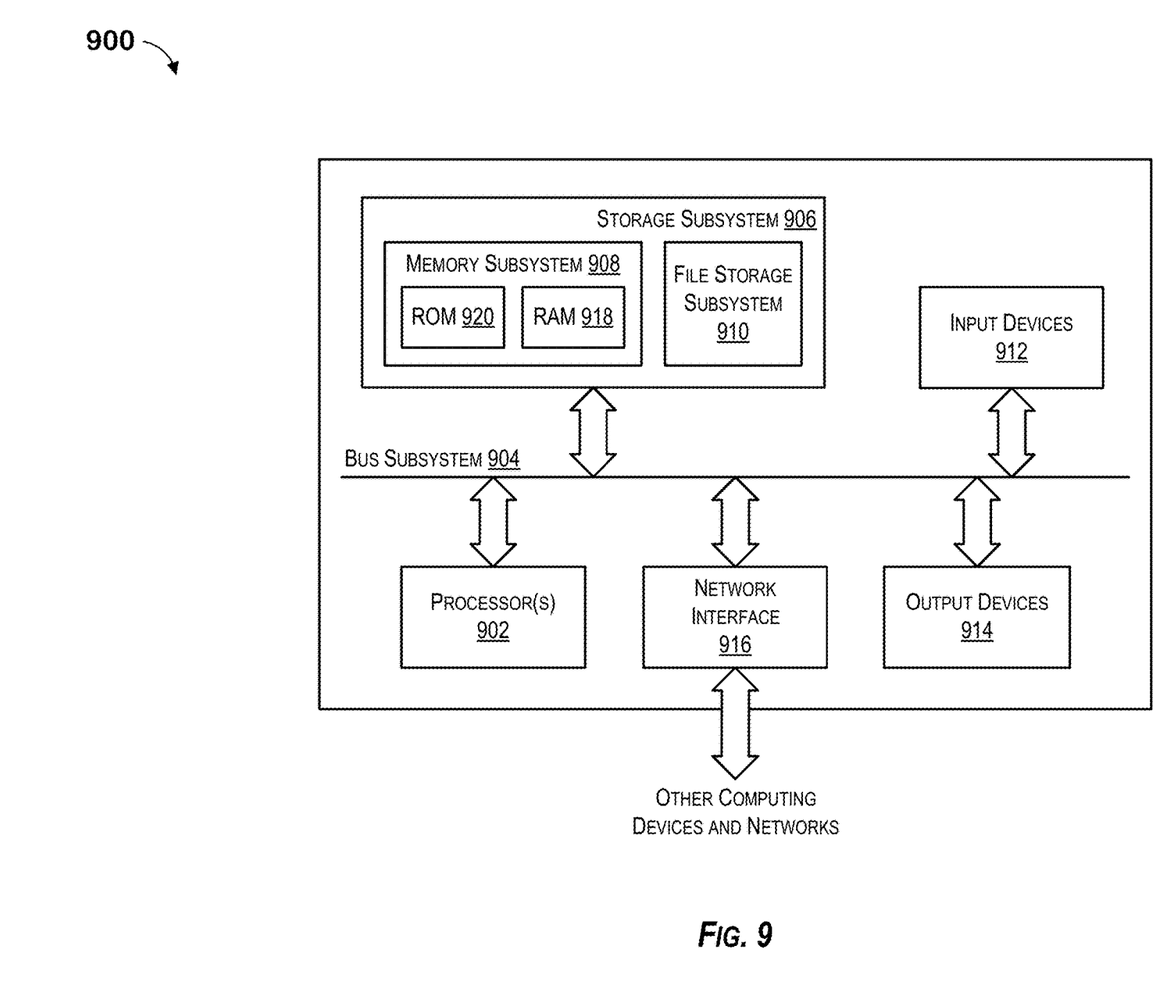
FIG. 9 depicts a simplified block diagram of an example computer system according to some embodiments.

The techniques describe above may be implemented in a wide range of computer systems configured to process neural networks. FIG. 9 depicts a simplified block diagram of an example computer system 900, which can be used to implement the techniques described in the foregoing disclosure. In some embodiments, computer system 900 may be used to implement residual neural network 100. As shown in FIG. 9, computer system 900 includes one or more processors 902 that communicate with a number of peripheral devices via a bus subsystem 904. These peripheral devices may include a storage subsystem 906 (e.g., comprising a memory subsystem 908 and a file storage subsystem 910) and a network interface subsystem 916. Some computer systems may further include user interface input devices 912 and/or user interface output devices 914.

Bus subsystem 904 can provide a mechanism for letting the various components and subsystems of computer system 900 communicate with each other as intended. Although bus subsystem 904 is shown schematically as a single bus, alternative embodiments of the bus subsystem can utilize multiple busses.

Network interface subsystem 916 can serve as an interface for communicating data between computer system 900 and other computer systems or networks. Embodiments of network interface subsystem 916 can include, e.g., Ethernet, a Wi-Fi and/or cellular adapter, a modem (telephone, satellite, cable, ISDN, etc.), digital subscriber line (DSL) units, and/or the like.

Storage subsystem 906 includes a memory subsystem 908 and a file/disk storage subsystem 910. Subsystems 908 and 910 as well as other memories described herein are examples of non-transitory computer-readable storage media that can store executable program code and/or data that provide the functionality of embodiments of the present disclosure.

Memory subsystem 908 includes a number of memories including a main random access memory (RAM) 918 for storage of instructions and data during program execution and a read-only memory (ROM) 920 in which fixed instructions are stored. File storage subsystem 910 can provide persistent (e.g., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 900 is illustrative and many other configurations having more or fewer components than system 900 are possible.

Figure 10:
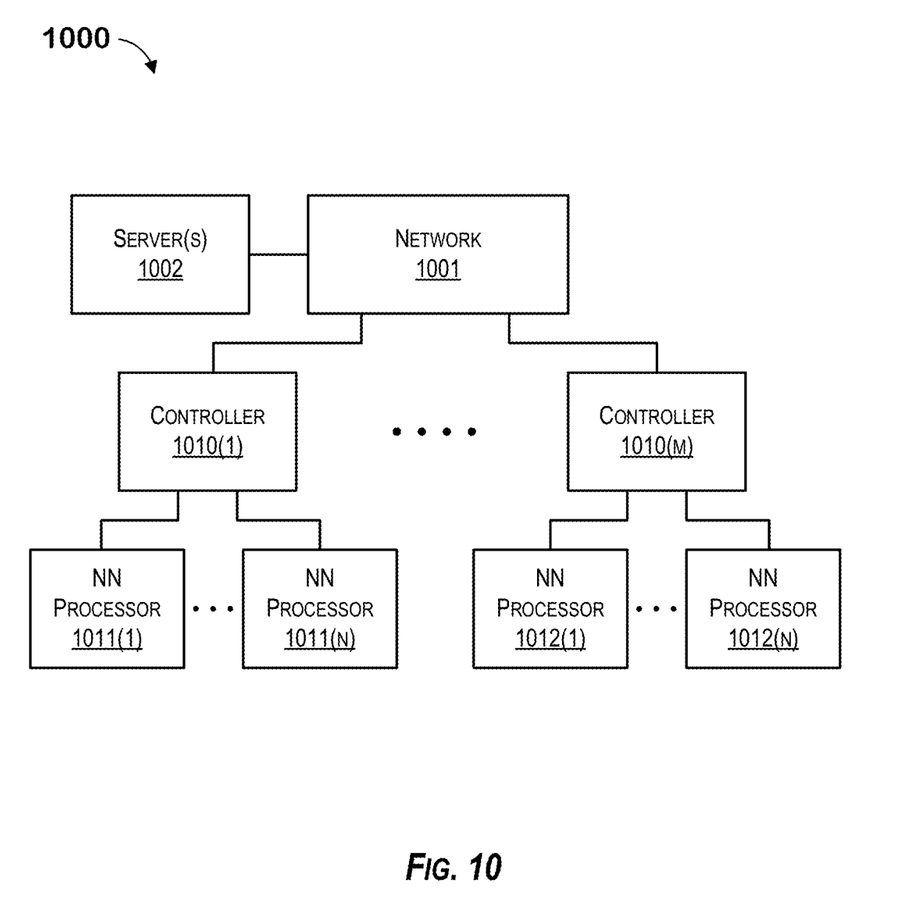
FIG. 10 illustrates a neural network processing system according to some embodiments.

FIG. 10 illustrates a neural network processing system according to some embodiments. In various embodiments, neural networks according to the present disclosure may be implemented and trained in a hardware environment comprising one or more neural network processors. A neural network processor may refer to various graphics processing units (GPU) (e.g., a GPU for processing neural networks produced by Nvidia Corp®), field programmable gate arrays (FPGA) (e.g., FPGAs for processing neural networks produced by Xilinx®), or a variety of application specific integrated circuits (ASICs) or neural network processors comprising hardware architectures optimized for neural network computations, for example. In this example environment, one or more servers 1002, which may comprise architectures illustrated in FIG. 9 above, may be coupled to a plurality of controllers 1010(1)-1010(M) over a communication network 1001 (e.g. switches, routers, etc.). Controllers 1010(1)-1010(M) may also comprise architectures illustrated in FIG. 9 above. Each controller 1010(1)-1010(M) may be coupled to one or more NN processors, such as processors 1011(1)-1011(N) and 1012(1)-1012(N), for example. NN processors 1011(1)-1011(N) and 1012(1)-1012(N) may include a variety of configurations of functional processing blocks and memory optimized for neural network processing, such as training or inference. The NN processors are optimized for neural network computations. Server 1002 may configure controllers 1010 with NN models as well as input data to the models, which may be loaded and executed by NN processors 1011(1)-1011(N) and 1012(1)-1012(N) in parallel, for example. Models may include layers and associated weights as described above, for example. NN processors may load the models and apply the inputs to produce output results. NN processors may also implement training algorithms described herein, for example.

FURTHER EXAMPLE EMBODIMENTS

In various embodiments, the present disclosure includes systems, methods, and apparatuses for reducing hardware resource utilization by residual neural networks. The techniques described herein may be embodied in non-transitory machine-readable medium storing a program executable by a computer system, the program comprising sets of instructions for performing the techniques described herein. In some embodiments, a system includes a set of processing units and a non-transitory machine-readable medium storing instructions that when executed by at least one processing unit in the set of processing units cause the at least one processing unit to perform the techniques described above. In some embodiments, the non-transitory machine-readable medium may be memory, for example, which may be coupled to one or more controllers or one or more artificial intelligence processors, for example.

The following techniques may be embodied alone or in different combinations and may further be embodied with other techniques described herein.

For example, in one embodiment, the present disclosure includes a system comprising a set of processing units and a non-transitory machine-readable medium storing instructions that when executed by at least one processing unit in the set of processing units cause the at least one processing unit to receive, at a layer included in a neural network, a first matrix; compress the first matrix to produce a second matrix to reduce an amount of hardware resources utilized to process the second matrix, the second matrix having a reduced dimensionality relative to a dimensionality of the first matrix; process the second matrix through a network block in the layer included in the neural network; expand the processed second matrix to produce a third matrix, the third matrix having a dimensionality that is equal to a dimensionality of the first matrix; and add the third matrix to the first matrix to produce a fourth matrix.

In one embodiment, compressing the input matrix comprises selecting every nth element in the first matrix as elements in the second matrix.

In one embodiment, compressing the input matrix comprises selecting a set of successive elements in the first matrix as elements in the second matrix.

In one embodiment, the present disclosure identifies a third token in the set of tokens that is the same as the first and second tokens in the set of tokens and combines the position value representing the third token with the position values representing the first and second tokens. Modifying the set of tokens is by further removing the third token from the set of tokens.

In one embodiment, the layer is a first layer. The present disclosure receives, at a second layer included in the neural network, the fourth matrix; compress the fourth matrix to produce a fifth matrix, the fifth matrix having a reduced dimensionality relative to a dimensionality of the fourth matrix; process the fifth matrix through a network block in the second layer included in the neural network; expand the processed fifth matrix to produce an sixth matrix, the sixth matrix having a dimensionality that is equal to a dimensionality of the fourth matrix; and add the sixth matrix to the fourth matrix to produce a seventh matrix.

In one embodiment, compressing the first matrix comprises selecting every nth element in the first matrix as elements in the second matrix. Compressing the fourth matrix comprises selecting every nth element in the fourth matrix from a defined offset as elements in the fifth matrix.

In one embodiment, compressing the first matrix comprises selecting a set of successive elements in the first matrix as elements in the second matrix. Compressing the fourth matrix comprises selecting a set of successive elements in the fourth matrix as elements in the fifth matrix.

In one embodiment, the network block is a first network block. The layer further includes a second network block configured to determine how to compress the first matrix and expand the third matrix.

In one embodiment, the neural network comprises a transformer model and the network block is a transformer encoder.

In one embodiment, the network block in the layer included in the neural network is configured to accept input matrices having a defined dimensionality. The dimensionality of the second matrix is equal to the defined dimensionality of the network block.

In one embodiment, expanding the processed second matrix comprises placing elements from the second matrix into the third matrix in the same corresponding positions as positions of the elements in the first matrix and padding remaining positions in the third matrix with zero values.

The above description illustrates various embodiments of the present disclosure along with examples of how aspects of the particular embodiments may be implemented.

The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A system comprising:
    a set of processing units; and
    a non-transitory machine-readable medium storing instructions that when executed by at least one processing unit in the set of processing units cause the at least one processing unit to:
    receive, at a layer included in a neural network, a first matrix;
    compress the first matrix to produce a second matrix to reduce an amount of hardware resources utilized to process the second matrix, the second matrix having a reduced dimensionality relative to a dimensionality of the first matrix;
    process the second matrix through a network block in the layer included in the neural network;
    expand the processed second matrix to produce a third matrix, the third matrix having a dimensionality that is equal to a dimensionality of the first matrix; and
    add the third matrix to the first matrix to produce a fourth matrix.

2. The system of claim 1, wherein compressing the input matrix comprises selecting every nth element in the first matrix as elements in the second matrix.

3. The system of claim 1, wherein compressing the input matrix comprises selecting a set of successive elements in the first matrix as elements in the second matrix.

4. The system of claim 1, wherein the layer is a first layer, wherein the instructions further cause the at least one processing unit to:
    receive, at a second layer included in the neural network, the fourth matrix;
    compress the fourth matrix to produce a fifth matrix, the fifth matrix having a reduced dimensionality relative to a dimensionality of the fourth matrix;
    process the fifth matrix through a network block in the second layer included in the neural network;
    expand the processed fifth matrix to produce an sixth matrix, the sixth matrix having a dimensionality that is equal to a dimensionality of the fourth matrix; and
    add the sixth matrix to the fourth matrix to produce a seventh matrix.

5. The system of claim 4, wherein compressing the first matrix comprises selecting every nth element in the first matrix as elements in the second matrix, wherein compressing the fourth matrix comprises selecting every nth element in the fourth matrix from a defined offset as elements in the fifth matrix.

6. The system of claim 4, wherein compressing the first matrix comprises selecting a set of successive elements in the first matrix as elements in the second matrix, wherein compressing the fourth matrix comprises selecting a set of successive elements in the fourth matrix as elements in the fifth matrix.

7. The system of claim 1, wherein the network block is a first network block, wherein the layer further includes a second network block configured to determine how to compress the first matrix and expand the third matrix.

8. The system of claim 1, wherein the neural network comprises a transformer model, wherein the network block is a transformer encoder.

9. The system of claim 1, wherein the network block in the layer included in the neural network is configured to accept input matrices having a defined dimensionality, wherein the dimensionality of the second matrix is equal to the defined dimensionality of the network block.

10. The system of claim 1, wherein expanding the processed second matrix comprises:
    placing elements from the second matrix into the third matrix in the same corresponding positions as positions of the elements in the first matrix; and
    padding remaining positions in the third matrix with zero values.

11. A method comprising:
    receiving, at a layer included in a neural network, a first matrix;
    compressing the first matrix to produce a second matrix to reduce an amount of hardware resources utilized to process the second matrix, the second matrix having a reduced dimensionality relative to a dimensionality of the first matrix;
    processing the second matrix through a network block in the layer included in the neural network;
    expanding the processed second matrix to produce a third matrix, the third matrix having a dimensionality that is equal to a dimensionality of the first matrix; and
    adding the third matrix to the first matrix to produce a fourth matrix.

12. The method of claim 11, wherein compressing the input matrix comprises selecting every nth element in the first matrix as elements in the second matrix.

13. The method of claim 11, wherein compressing the input matrix comprises selecting a set of successive elements in the first matrix as elements in the second matrix.

14. The method of claim 11, wherein the network block in the layer included in the neural network is configured to accept input matrices having a defined dimensionality, wherein the dimensionality of the second matrix is equal to the defined dimensionality of the network block.

15. The method of claim 11, wherein expanding the processed second matrix comprises:
    placing elements from the second matrix into the third matrix in the same corresponding positions as positions of the elements in the first matrix; and
    padding remaining positions in the third matrix with zero values.

16. A non-transitory machine-readable medium storing a program executable by at least one processing unit of a computer system, the program comprising sets of instructions for:
    receiving, at a layer included in a neural network, a first matrix;
    compressing the first matrix to produce a second matrix to reduce an amount of hardware resources utilized to process the second matrix, the second matrix having a reduced dimensionality relative to a dimensionality of the first matrix;

processing the second matrix through a network block in the layer included in the neural network;

expanding the processed second matrix to produce a third matrix, the third matrix having a dimensionality that is equal to a dimensionality of the first matrix; and adding the third matrix to the first matrix to produce a fourth matrix.

17. The non-transitory machine-readable medium of claim 16, wherein the layer is a first layer, wherein the program further comprises sets of instructions for:

receiving, at a second layer included in the neural network, the fourth matrix;

compressing the fourth matrix to produce a fifth matrix, the fifth matrix having a reduced dimensionality relative to a dimensionality of the fourth matrix;

processing the fifth matrix through a network block in the second layer included in the neural network;

expanding the processed fifth matrix to produce an sixth matrix, the sixth matrix having a dimensionality that is equal to a dimensionality of the fourth matrix; and adding the sixth matrix to the fourth matrix to produce a seventh matrix.

18. The non-transitory machine-readable medium of claim 17, wherein compressing the first matrix comprises selecting every nth element in the first matrix as elements in the second matrix, wherein compressing the fourth matrix comprises selecting every nth element in the fourth matrix from a defined offset as elements in the fifth matrix.

19. The non-transitory machine-readable medium of claim 17, wherein compressing the first matrix comprises selecting a set of successive elements in the first matrix as elements in the second matrix, wherein compressing the fourth matrix comprises selecting a set of successive elements in the fourth matrix as elements in the fifth matrix.

20. The non-transitory machine-readable medium of claim 16, wherein the network block is a first network block, wherein the layer further includes a second network block configured to determine how to compress the first matrix and expand the third matrix.

* * * * *